(12) United States Patent
Bönsch et al.

(10) Patent No.: US 12,083,906 B2
(45) Date of Patent: Sep. 10, 2024

(54) CONNECTION DEVICE FOR CHARGING AN ELECTRIC VEHICLE

(71) Applicant: Weidmüller Interface GmbH & Co. KG, Detmold (DE)

(72) Inventors: Matthias Bönsch, Bielefeld (DE); Torsten Wünsche, Leopoldshöhe (DE); Klaus Holterhoff, Olpe (DE); Thomas Kriete, Lotte (DE)

(73) Assignee: Weidmüller Interface GmbH & Co. KG (DE)

( * ) Notice: Subject to any disclaimer, the term of this patent is extended or adjusted under 35 U.S.C. 154(b) by 437 days.

(21) Appl. No.: 17/310,725

(22) PCT Filed: Mar. 31, 2020

(86) PCT No.: PCT/EP2020/059160
§ 371 (c)(1),
(2) Date: Aug. 19, 2021

(87) PCT Pub. No.: WO2020/201300
PCT Pub. Date: Oct. 8, 2020

(65) Prior Publication Data
US 2022/0161670 A1     May 26, 2022

(30) Foreign Application Priority Data
Mar. 31, 2019 (DE) .......................... 102019108364.8

(51) Int. Cl.
*H01M 10/46* (2006.01)
*B60L 53/16* (2019.01)
*B60L 53/18* (2019.01)
*B60L 53/30* (2019.01)
*H01R 13/502* (2006.01)
*H01R 13/66* (2006.01)

(52) U.S. Cl.
CPC ............... *B60L 53/16* (2019.02); *B60L 53/18* (2019.02); *B60L 53/30* (2019.02); *H01R 13/502* (2013.01); *H01R 13/665* (2013.01); *H01R 2201/26* (2013.01)

(58) Field of Classification Search
CPC ........ H02J 7/0042; B60L 53/16; B60L 53/18; B60L 53/30; B60L 53/14; H01R 13/502; H01R 13/665; H01R 2201/26
USPC .................. 320/104, 107, 109, 111, 114, 115
See application file for complete search history.

(56) References Cited

FOREIGN PATENT DOCUMENTS

| AT | 12232 U1 | 1/2012 |
|---|---|---|
| DE | 102017118916 A1 | 2/2019 |
| DE | 102017124469 A1 | 3/2019 |
| DE | 102019204000 A1 * | 10/2020 |

\* cited by examiner

*Primary Examiner* — Edward Tso
(74) *Attorney, Agent, or Firm* — Laubscher & Fretwell

(57) ABSTRACT

A connection device for charging an electric vehicle includes a main unit on which a charging socket is arranged for plugging in a charging cable for connecting to the electric vehicle or to which the charging cable is connected directly. The connection device includes an additional connection with a separate additional housing on which an additional charging socket for a further charging cable is arranged or to which the further charging cable is connected directly.

11 Claims, 5 Drawing Sheets

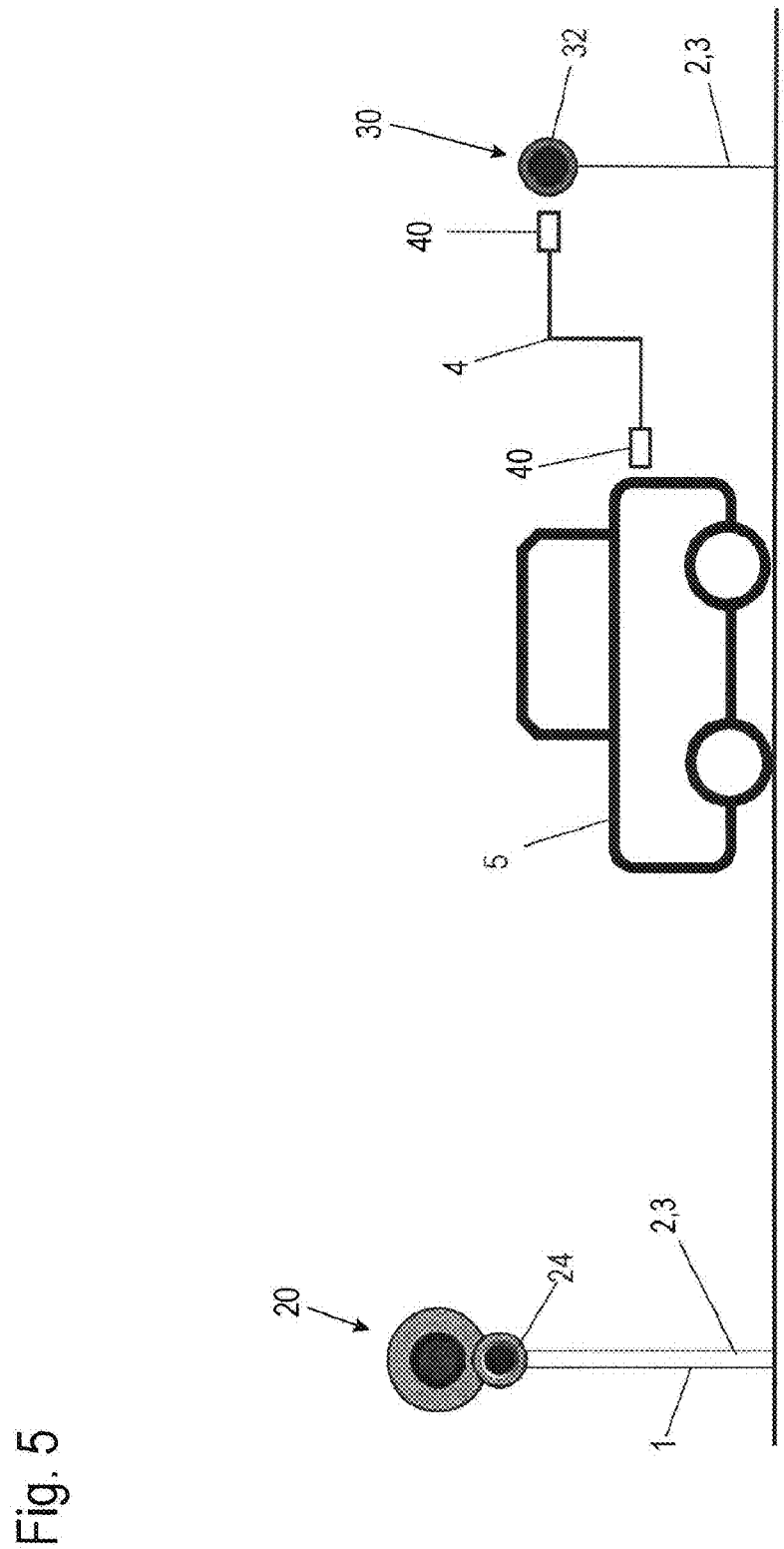

CONNECTION DEVICE FOR CHARGING AN ELECTRIC VEHICLE

This application is a national application based on PCT/EP2020/059160 filed Mar. 31, 2020. PCT/EP2020/059160 claims priority of DE 10 2019 108 364.8 filed Mar. 31, 2019. The entire content of these applications is incorporated herein by reference.

BACKGROUND OF THE INVENTION

The invention relates to a connection device for charging an electric vehicle, including a main unit on which a charging socket is arranged for plugging in a charging cable for connecting to the electric vehicle, or to which the charging cable is connected directly.

BRIEF DESCRIPTION OF THE PRIOR ART

Electric vehicles are connected to a direct or alternating current supply line in order to charge up the drive battery or batteries for the driving operation. For this purpose, connection devices in the form of cabinets or columns, which are set up in the private or public traffic sector and to which electric vehicles can be connected for charging, have become established. Connection cabinets are normally mounted on a wall and are also referred to as "wall boxes". Charging columns are normally freestanding.

The connection devices are usually connected to a power grid via a multi-phase, typically three-phase, connection cable. The connection device offers the possibility of plugging in a connecting or charging cable specially suited for these purposes. Alternatively, the charging cable for connecting to the vehicle can be firmly connected to the connection device. In the charging cable, alongside the power supply lines via which the power for charging the battery is transmitted, there are also provided signal lines which are used for the exchange of signals or data with which parameters of the charging procedure are communicated between the connection device and the vehicle. A release of the supply of the charging current also takes place via the signal line, if suitable parameters exist for the charging procedure or have been adjusted in the vehicle or the connection device.

Along with the contact possibilities for the power supply cable and the charging cable to the vehicle, safety mechanisms that safeguard against excess current and fault current during the charging procedure are usually present in the connection device. Furthermore, current converters can be provided if current of a different voltage and/or a different type of current are required for the charging procedure. In the context of the application, the type of current is understood to be alternating current (AC) or direct current (DC).

Due to the connection lines of the connection devices in the range from approximately 10 kW to some tens of kW, the laying and installation of a normally 5-core cable with a conductor cross-section of typically 4 mm$^2$ or more is required for the supply of current. Such a connection cable, which is entirely solid for typical private domestic installations, is complex to lay and should be connected to the connection device only by licensed electricians.

By way of example, due to a change of vehicle, it may be necessary to alter the position of the connection device. Such a change in position can be required if a change is made to a different vehicle model in which the charging cable is plugged into a different location on the vehicle. In that case, a complex disassembly of the connection device and remounting at a different location must be carried out. It may also be necessary to provide a charging capability with a different plug standard in the event of a change of vehicle. Here too, reinstalling the connection device leads to high costs and workload.

SUMMARY OF THE INVENTION

An object of the present invention is therefore to provide a connection device for charging an electrically operated motor vehicle in which a charging connection can be varied in an uncomplicated manner with respect to its position and, if necessary, its plug standard.

A connection device according to the invention is characterized by an additional connection with a separate additional housing on which an additional charging socket for a further charging cable is arranged or to which the further charging cable is directly connected.

The additional connection makes it possible to provide a further charging possibility for the electric vehicle, without required functional components of the connection device, e.g. for communication with the vehicle and to activate the charging voltage having to be duplicated. If a charging socket is required on a different side of a parking space, for example, an entire, new or further connection device does not have to be installed or the existing one does not have to be dismounted and relocated, but rather the existing connection device can be supplemented by a remotely mounted additional connection. A similar advantage arises if two electric vehicles with charging cables of different standards are intended to be charged. The additional connection can be used to provide the charging cable of the different standard in a simple manner.

In an advantageous configuration of the connection device, the main unit is constructed in two parts and has a connection base for connecting at least one main power cable and for firm mounting onto a wall or onto a floor, and a module unit with functional components on which the charging socket is arranged or to which the charging cable is connected.

The module unit can thus advantageously be exchanged for the purposes of servicing or repair, without it being necessary to reinstall the main power cable. The exchange of the module unit can thus also be carried out by service personnel or even users, who are not trained or licensed electricians. After being placed on and connected to the base, a replaced, maintained or repaired module unit is immediately functional again. An exchange for a module unit with a different charging technology (DC/AC and/or different type of charging plug or charging socket) can also be performed in this way. Installation by a licensed electrician is required only for the initial mounting and when the connection base is connected for the first time.

In this case, the connection base and the module unit preferably have plug-in connectors corresponding to one another which produce an electrical connection between the two parts when the module unit is placed onto the connection base.

In a further configuration of the connection device, the main unit has power output terminals for connecting a power cable which leads to the additional connection. Likewise, signal terminals for connecting a signal cable leading to the additional connection can be present on the main unit. In this case, power cables and signal cables can be integrated in a common cable. The terminals enable connection of the additional connection even at a later point in time. The power output terminals and/or the signal terminals are preferably arranged on the connection base when the main part of the connection device is constructed in two parts as described above. In this case, the additional connection can be installed without it being necessary to intervene in the module unit. Furthermore, the advantage of the two-part nature of the main part, namely the simple dismounting and exchangeability of the module unit, is maintained even in the case of the installed additional connection.

In a further embodiment of the connection device, the charging socket or charging cable of the main unit or the charging socket or the further charging cable of the additional connection can be employed to charge the electric vehicle. This can be monitored by a control device in the main unit, for example. Simultaneous use of both charging possibilities is prevented, which could lead to mutual interference and overloading of the main unit or safety mechanisms connected upstream. Nevertheless, the flexibility of the optional use of the charging possibilities can be used.

In further configurations of the connection device, a single-phase main power socket and/or a lighting device can additionally be arranged on the main part and/or on the additional housing. The single-phase main power socket, e.g. a Schuko socket, can be used in order to be able to connect a charging device for an electric bicycle, for example. It is also conceivable for a complete charging appliance for the electric bicycle to be arranged in the main part and for a charging connector for the electric bicycle to be arranged on the main part and/or on the additional housing. The lighting device serves to illuminate the surroundings in order to simplify, for example, a connection of the charging plug to the electric vehicle in the event of bad light conditions, without an additional light having to be installed. Through the specified additional functions, the electrical installation for the connection device is advantageously also harnessed for other purposes.

BRIEF DESCRIPTION OF THE FIGURES

Other objects and advantages of the invention will become apparent from a study of the following description when viewed in the light of the accompanying drawing, in which:

FIG. 5 is a schematic view of a vehicle charging system with a connection device according to the application.

DETAILED DESCRIPTION

The connection device is configured as a so-called wall connection device, also referred to as a wall box, which is mounted on a wall near a charging location for an electric vehicle. Such wall-mounted connection devices are frequently employed in the private sector in garages or beside parking spaces for electric vehicles but can likewise be used in the public sector.

Figure 1:
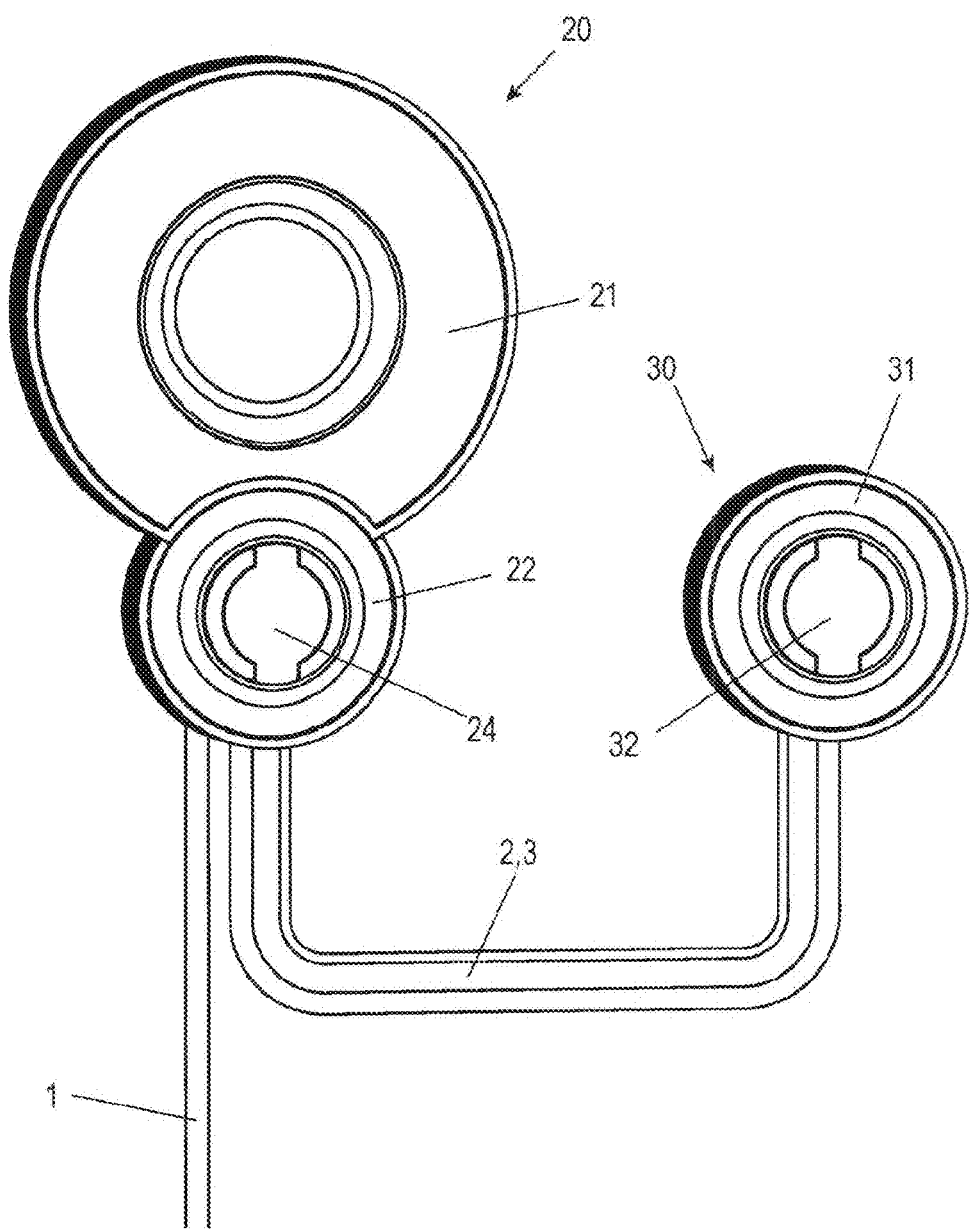
FIG. 1 is a perspective view of a first embodiment of a connection device with a main part and an additional connection.
Figure 2:
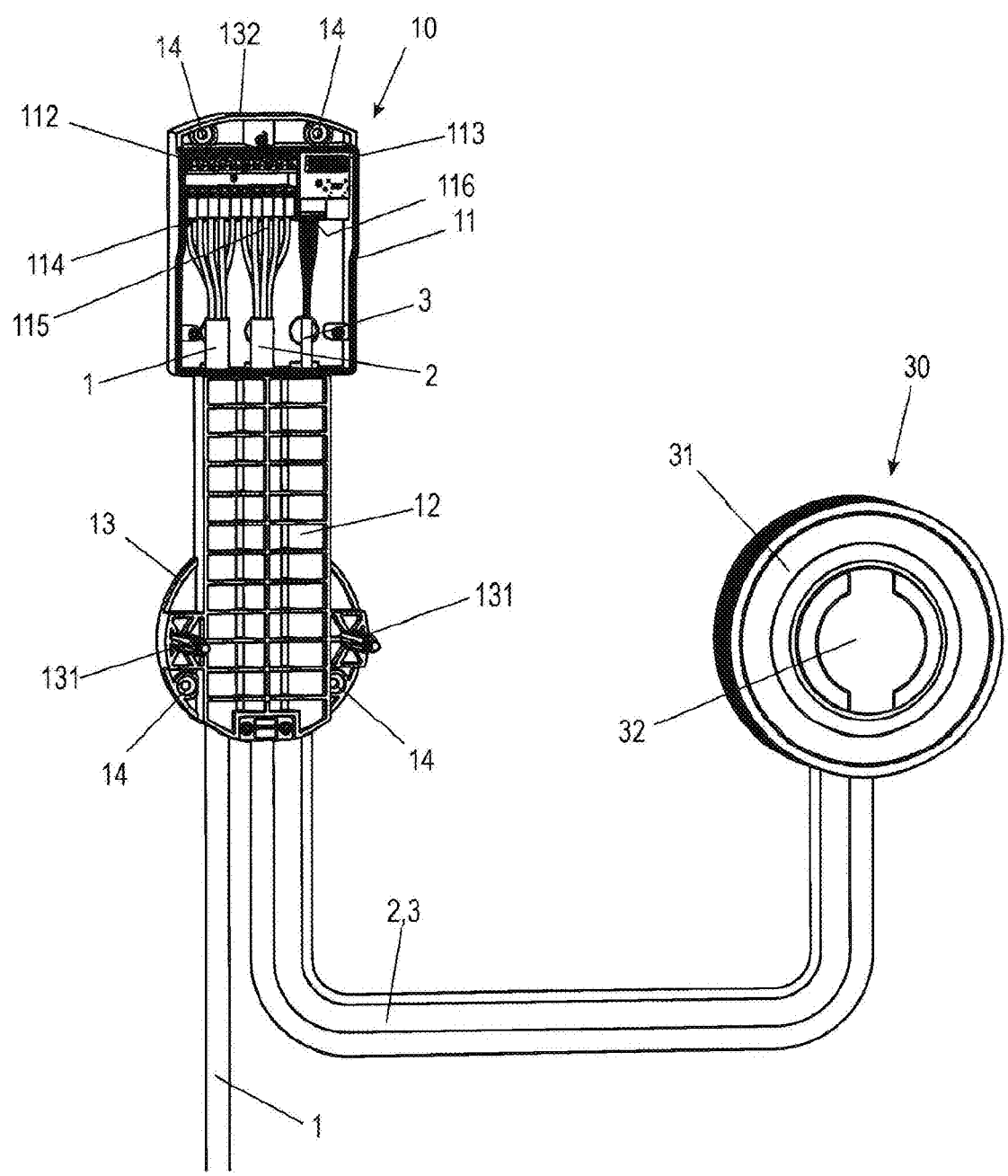
FIG. 2 is a perspective view of the connection device from FIG. 1, wherein the main part is depicted without a module housing.

The connection device has a main unit, which in the example shown is constructed with a module unit 20 which is placed onto a connection base 10 which is not visible in FIG. 1. FIG. 2 shows the arrangement from FIG. 1 with the module unit 20 removed so that the connection base 10 is visible. The connection device is thus constructed in at least two parts with the module unit 20 and the connection base 10, hereafter also simply called the base 10, which in this example is configured in the form of a connection plate.

The base 10 includes a connecting region 11, a cable channel 12 and an attaching region 13. Mounting boreholes 14, with which wall mounting can be performed, are provided in the attaching region 13 and also above the connecting region.

The module unit 20 includes a module housing 21 which in the present case is configured in the form of a flat round cylinder. In a lower region of the module housing 21 there is provided an auxiliary housing 22 which is similar in shape to the shape of the module housing 21. Functional components of the connection device are arranged in the module housing 21.

In the auxiliary housing 22 of the module unit 20, there is arranged a charging socket 24 to which a charging cable can be connected with an appropriate charging plug, in order to connect the connection device with an electric vehicle to be charged.

To protect from soiling and an ingress of moisture or insects, a manually operable sealing cover 111 may be arranged in front of the charging socket 24. Alternatively, the charging socket can be covered by a sealing cover which does not have to be opened manually by a user, but rather opens automatically, e.g. retracts, after the charging function is activated. An activation of the charging function can be performed for example via authentication with the aid of a short-range radio network, for example WLAN, Bluetooth or near field communication (NFC) via a mobile device of an authorized user. Only when the user has successfully authenticated himself does the sealing cover open and provide access to the charging socket 24. The authentication can be connected to a billing system if use is only permitted in return for a fee. The sealing cover 111 also offers protection from vandalism.

In an alternative configuration of the module unit 20, a module housing 21 can be provided which is configured as a flat cylinder similar to the previously shown exemplary embodiments. However, it is possible to dispense with the auxiliary housing 22 by arranging the charging socket 24 centrally on or in the module housing 21.

In a further alternative configuration, instead of the charging socket 24, a plug receptacle can be provided on the module housing 21 or on an auxiliary housing 22 into which plug receptacle a charging plug, which is connected to the electric vehicle for the charging procedure, can be inserted. The charging cable is directly connected to the module unit 20. The cylindrical configuration of the module housing 21 makes it possible to loop the charging cable around the module housing 21 when the electric vehicle is not being charged and the charging plug is stored in the plug receptacle. A display on which a status of the charging procedure, for example, is displayed can be integrated into the charging plug.

The module housing 21 can be mounted onto the base 10 via an attachment device, for example the bolt-shaped attaching device 131 in the attaching region 13. An attaching slot above the connecting region 11 serves as a further attaching mechanism into which slot an appropriate lug of the module housing 21 is hooked before the lower part of the module housing 21 is plugged and screwed onto the attaching device 131. The attaching slot 132 is visible in FIG. 2.

In the case of the connection device shown in the drawing, an electrical installation of a main power cable 1 occurs inside the connecting region 11 of the base 10. A cover 111 of the connecting region 11 can be removed for this purpose. When the module unit 20 is placed onto the base 10, the module unit is automatically electrically connected with the base via power plug-in connectors 112 arranged in the connecting region 11. Corresponding mating plug-in connectors (not shown) are arranged in the module unit 20.

The module unit 20 can thus easily be exchanged for the purposes of servicing or repair without it being necessary to reinstall the main power cable. The exchange of the module unit 20 can thus also be carried out by service personnel or even users of the charging system who are not trained electricians. It is also possible to carry out an exchange for a module unit with a different charging technology (DC/AC and/or other type of the charging plug or of the charging socket) in a similar manner.

Figure 3:
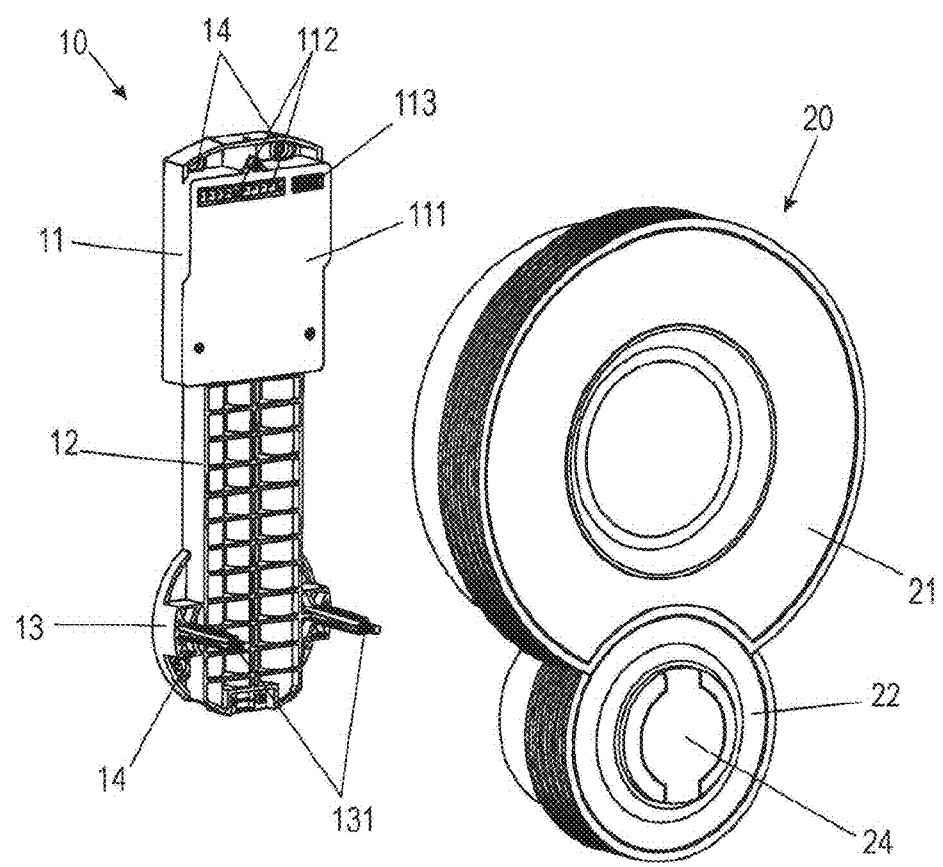
FIG. 3 is an exploded perspective view of the main part with a connection plate and module housing according to FIG. 1.

FIG. 2 shows the base 10 of the exemplary embodiment with a connected main power cable 1. The main power cable 1 leads into the base 10 from below. Alternatively, feed-in can also take place through a bore in the wall in the region of the base 10. Inside the base 10, the main power cable 1 extends through the cable channel 12 into the connecting region 11 shown in an open condition, i.e. without the cover 111. In the portion of the connecting region 11 which can be sealed by a cover as shown in FIG. 3, power input terminals 114 are arranged to which individual cores of the main power cable 1 can be connected. The power input terminals 114 can be push-in terminals, mousetrap terminals, or screw terminals. The power input terminals 114 are connected to the power plug-in connector 112 via which contact of the mounted module unit 20 then takes place.

A further power cable 2 is guided through the cable channel 12 alongside the main power cable 1. This power cable 2 is connected with power output terminals 115 which are connected with further contacts of the power plug-in connector 112. Furthermore, a signal cable 3 is likewise guided through the cable channel 12 which is connected to signal terminals 116. These signal terminals 116 are coupled inside the connecting region 11 to a control plug-in connector 113 which, like the power plug-in connector 112, is situated outside of the cover 111 and contacted by the module unit 20.

The power cable 2 and the signal cable 3 lead to an additional connection 30 which has an additional charging socket 32 in an additional housing 31 for connecting the electric vehicle.

As described above, the module unit 20 includes functional components within the module housing 21 which make it possible to charge the electric vehicle via the charging socket 24 or via a connected charging cable with a charging plug.

In a typical charging process for an electric vehicle, the charging cable of the electric vehicle has wires via which the charging power is transmitted, and at least two signal wires. Via the signal wires, the connection device first provides a coded signal, by which the connection device conveys the maximum available charging power to the electric vehicle. If the electric vehicle accepts this charging power, a return signal is conveyed from the electric vehicle to the connection device, whereupon it loads the power wires with the charging voltage in order to also supply the charging power.

Appropriate functional units for handling the specified communication and for activating the charging voltages are arranged in the module unit 20. The main power voltage can be directly delivered to the electric vehicle as the charging voltage on one to three phases. This is the case, for example, with charging plugs of Type 2. At a main power voltage up to 3×63 A can be transmitted in this manner. In alternative configurations of the connection device, it is conceivable to generate a charging voltage of a different level (compared to the main power voltage) or also of a different kind, for example direct voltage instead of alternating voltage, within the connection device and to provide it to the electric vehicle.

Furthermore, it is possible to provide functional component units via which a connection to a data network can take place. Monitoring can be carried out via such a network connection, e.g. to query the status and/or to transmit protocols on the charging procedures. It is also conceivable to control the charging procedure via the network connection. In connection with a local energy-generation system, e.g. a photovoltaic system, as much locally and renewably generated energy as possible can be used to charge the electric vehicle. Moreover, the timing of the charging procedure can be controlled, e.g. in order to be able to use cheaper power rates at certain times. It is also possible for a power supply company to influence the charging procedure via the network.

The additional connection 30 makes it possible to provide a further charging possibility for the electric vehicle without duplicating the corresponding functional components for communication with the vehicle and/or activation of the charging voltage. For this purpose, the signal wires guided to the motor vehicle are provided via the control plug-in connector 113 and the signal terminals 116 and the signal cable 3 to the additional charging socket 32. The power wires are likewise guided from the module unit 20 via the power plug-in connector 12 and the power output terminals 115 and the power cable 2 to the additional charging socket 32.

In a preferred configuration, a single-phase main power socket, e.g. a Schuko socket, is also arranged on the module housing 21, on the auxiliary housing 22 and/or on the additional housing 31, for example, in order to be able to connect a charging appliance for an electric bicycle. It is also conceivable for a complete charging appliance for the electric bicycle to be arranged in the module housing 21 and a charging connector for the electric bicycle on the module housing 21, on the auxiliary housing 22 or on the additional housing 31.

In a further configuration, the module housing 21, the auxiliary housing 22 and/or the additional housing 31 includes a lighting apparatus for illuminating the surroundings. In this manner, connection of the charging plug to the electric vehicle in poor light conditions is simplified without a light having to be installed.

In a further configuration, removable coverings can be arranged on a surface of the module or auxiliary housing 21, 22. These may, for example, latch onto the module or auxiliary housing 21, 22 and/or be attached by a magnetic closure. Access for the attaching device 131, for example, may be situated under the cover in order to be able to attach the module unit 20 after it has been placed onto the base 10. An access aperture in the module housing 21 can also be arranged under the cover. In this case, for safety and or isolation reasons, the access aperture may be sealed by a further cover. If this is also removed, the access aperture makes it possible to access a safety mechanism, for example.

Such a safety mechanism can be a fault-current circuit breaker, for example, which is arranged in the module housing 20 and which is triggered upon detection of a fault current, in particular a direct current fault current. The triggering of a fault-current circuit breaker can be elicited for example by a film of moisture on the charging plug. After the charging plug is dried, the charging procedure could be started or continued, but with the fault-current circuit-breaking device first having to be reset. Due to the easy accessibility of the safety mechanism, this can be performed by a user in the event of a fault without a service technician being required, which would be the case if the module housing 21 had to be opened in order to reset the fault-current circuit breaker.

Of course, comparable access apertures for other safety or adjustment elements, e.g. a reset switch, of the functional components of the module unit 20 can be provided on the module housing 21 or also on auxiliary housing 22.

A further advantage of removable covers is that they can be formed in an individual design in order to customize or brand the module unit 20. It is thus possible to achieve a distinctive appearance of the connection device, even if the module housing 21 or auxiliary housing 22 are available only in one or a few color and design variations. A comparable cover can also be provided for the additional housing 31 of the additional connection 30.

Figure 4:
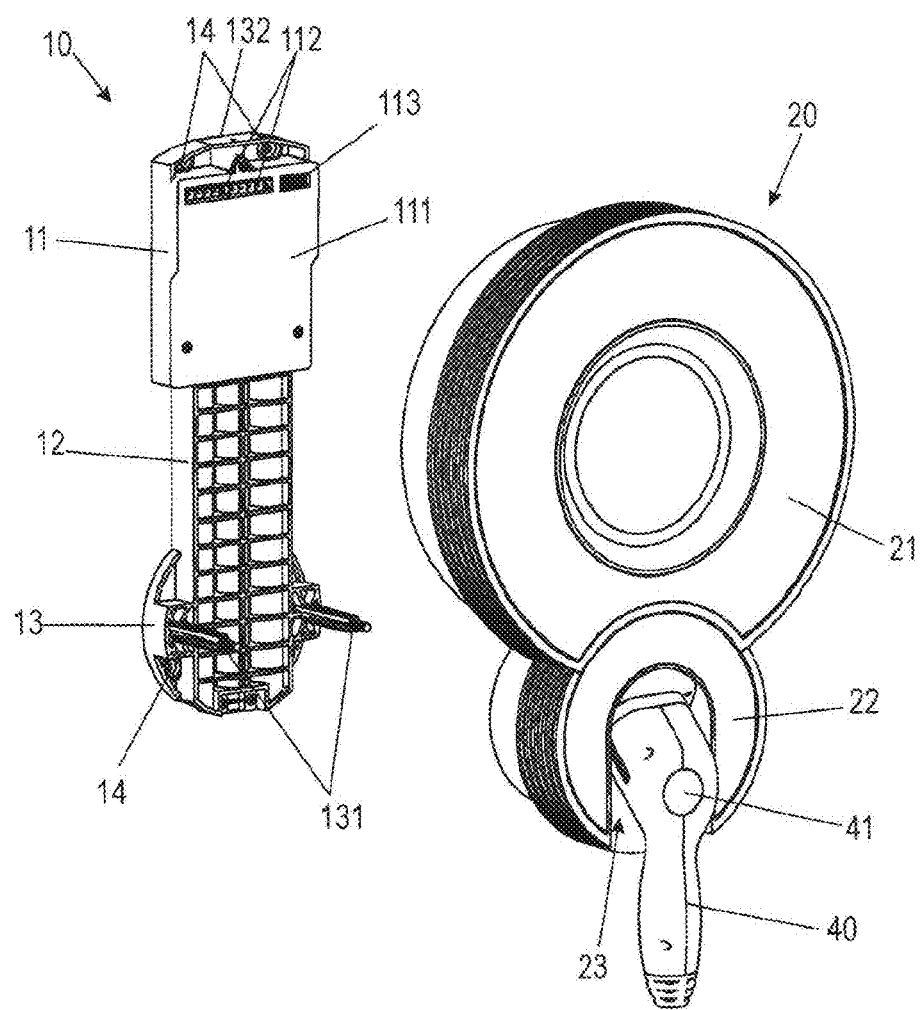
FIG. 4 is an exploded perspective view of an alternative configuration of the assembly according to FIG. 3.

FIG. 3 shows the charging assembly including the base 10 and the module unit 20 in an isometric exploded view wherein the connecting region 11 of the base 10 is covered with a cover 111. In the same way as FIG. 3, FIG. 4 shows the aforementioned alternative configuration of the module unit 20 in which a charging cable (not shown) is firmly connected to the module unit 20. Instead of the charging socket 24, a plug receptacle 23 is provided on the auxiliary housing 23 in order to be able to hang up a charging plug 40 which is connected to the free end of the charging cable when not in use. In this example, the plug 40 has a display 41, e.g. to display the charging state.

FIG. 5 shows the use of the connection device with the additional connection 30. This additional connection 30 is advantageous if the intention is to charge a different type of electric vehicle 5, whose connection for a charging cable 40 is arranged at a different location on the vehicle. Instead of complete reinstallation of the module unit 20, it can remain at the original site and the additional connection 30 can be installed at the required location via the power cable 2 and the signal cable 3. Thereafter, it is possible to alternatively use the charging socket 24 or the additional charging socket 32, depending on the type of electric vehicle 5 to be charged. Different types of charging cables or charging plugs can also be operated in this way without installing a second connection device.

The module unit provides a control by which the unused charging socket 24 or 32 is not supplied with current when the charging procedure is already being carried out using the respective other charging socket.

Alternatively, the charging socket 24 is switched off as soon as an additional connection 30 is installed. However, the reciprocal use of the two charging sockets 24, 32 is then not possible.

In the embodiments described above, the connection device to which the additional connection 30 can be connected is designed for wall mounting, i.e. formed as a "wall box". In alternative configurations, the connection device can also be a freestanding charging column. Irrespective of the configuration of the connection device, the additional connection 30, which is likewise designed for wall mounting in the examples shown, can also be configured in the form of a freestanding column.

The invention claimed is:

1. A connection device for charging an electric vehicle, comprising
    (a) a main charging unit including a housing;
    (b) a first charging cable connected at one end with said main charging unit housing and configured at another end for connection with the electric vehicle;
    (c) an auxiliary connection device including a housing connected with said main charging unit; and
    (d) a second charging cable connected at one end with said auxiliary connection device housing and configured at another end for connection with another electric vehicle, said main charging unit preventing current from being supplied to an unused charging cable when one of said first and second charging cables is being used to charge the or another electric vehicle.

2. The connection device as defined in claim 1, wherein said main charging unit housing and said auxiliary connection device housing each include a charging socket, said first charging cable being connected with said main charging unit housing charging socket and said second charging cable being connected with said auxiliary connection device housing charging socket.

3. The connection device as defined in claim 2, wherein said main charging unit includes a connection base configured for mounting on one of a wall and floor and for connection with a power cable and a module unit on which said charging socket is arranged.

4. The connection device as defined in claim 3, wherein said connection base and said module unit have corresponding plug-in connectors which produce an electrical connection when said module unit is placed onto said connection base.

5. The connection device as defined in claim 3, wherein said main charging unit includes power output terminals and a power cable connected at one end with said power output terminals and at another end with said auxiliary connection device housing.

6. The connection device as defined in claim 5, wherein said main charging unit includes signal terminals and a signal cable connected at one end with said signal terminals and at another end with said auxiliary connection device housing.

7. The connection device as defined in claim 6, wherein said power and signal cables are integrated in a common cable.

8. The connection device as defined in claim 5, wherein said power output terminals are arranged on said connection base.

9. The connection device as defined in claim 2, wherein one of said main charging unit housing charging socket and said first charging cable and said auxiliary connection device housing charging socket and said second charging cable is employed to charge the electric vehicle.

10. The connection device as defined in claim 2, wherein at least one of said main charging unit and said auxiliary connection device housing includes a single-phase main power socket.

11. The connection device as defined in claim 2, wherein at least one of said main charging unit housing and said auxiliary connection device housing includes a lighting apparatus.

* * * * *